(12) United States Patent
Huang et al.

(10) Patent No.: US 10,409,401 B2
(45) Date of Patent: Sep. 10, 2019

(54) THREE-DIMENSIONAL CURVED TOUCH PANEL AND TOUCH DISPLAY APPARATUS

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chen-Hsing Huang, Guangdong (CN); Pei-Yin Chou, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 62 days.

(21) Appl. No.: 15/847,902

(22) Filed: Dec. 19, 2017

(65) Prior Publication Data

US 2019/0113994 A1    Apr. 18, 2019

(30) Foreign Application Priority Data

Oct. 16, 2017  (CN) .......................... 2017 1 0970187

(51) Int. Cl.
*G06F 3/041* (2006.01)

(52) U.S. Cl.
CPC .......... *G06F 3/041* (2013.01); *G06F 3/04164* (2019.05); *G06F 2203/04102* (2013.01)

(58) Field of Classification Search
CPC ....................... G06F 3/041; G06F 2203/04102
See application file for complete search history.

(56) References Cited

U.S. PATENT DOCUMENTS

| | | | |
|---|---|---|---|
| 9,122,319 B2* | 9/2015 | Kwak | G06F 3/0487 |
| 9,886,100 B2* | 2/2018 | Jung | G06F 3/03 |
| 9,990,055 B2* | 6/2018 | Seo | G06F 3/0487 |
| 10,069,100 B2* | 9/2018 | Zhang | H01L 51/5253 |
| 2012/0038570 A1* | 2/2012 | Delaporte | G06F 1/1616 345/173 |
| 2013/0154971 A1* | 6/2013 | Kang | G06F 3/0414 345/173 |
| 2013/0300682 A1* | 11/2013 | Choi | H04M 1/0268 345/173 |
| 2014/0055375 A1* | 2/2014 | Kim | G06F 1/1652 345/173 |

(Continued)

*Primary Examiner* — Vinh T Lam
(74) *Attorney, Agent, or Firm* — CKC & Partners Co., LLC

(57) ABSTRACT

A three-dimensional curved touch panel includes a light-transmissivity substrate and a touch-sensing module. The light-transmissivity substrate has a three-dimensional curved surface. The three-dimensional curved surface is defined with a sensing area and a surrounding area surrounding the sensing area. The touch-sensing module is bonded to the sensing area and the surrounding area of the three-dimensional curved surface. The touch-sensing module is provided with two indentations which are opposite to each other at an edge thereof. The indentations are located in the surrounding area, and the sensing area is located between the indentations.

14 Claims, 6 Drawing Sheets

(56) References Cited

U.S. PATENT DOCUMENTS

| | | | |
|---|---|---|---|
| 2015/0169127 A1* | 6/2015 | Park | G09G 3/001 |
| | | | 345/173 |
| 2015/0227172 A1* | 8/2015 | Namkung | G06F 1/1652 |
| | | | 345/173 |
| 2015/0227173 A1* | 8/2015 | Hwang | G06F 1/1652 |
| | | | 345/619 |
| 2015/0355728 A1* | 12/2015 | Cho | G06F 1/1652 |
| | | | 345/173 |
| 2016/0084994 A1* | 3/2016 | Namkung | G02B 1/14 |
| | | | 345/173 |
| 2016/0110097 A1* | 4/2016 | Cho | G06F 3/04886 |
| | | | 345/178 |
| 2016/0147362 A1* | 5/2016 | Eim | G06F 1/1641 |
| | | | 345/173 |
| 2016/0358989 A1* | 12/2016 | Kwon | H01L 27/3276 |
| 2017/0038896 A1* | 2/2017 | Lee | G06F 3/03545 |
| 2017/0221456 A1* | 8/2017 | Kim | G06F 3/013 |
| 2017/0264888 A1* | 9/2017 | Valentine | H04N 13/31 |
| 2017/0277290 A1* | 9/2017 | Murakami | G06F 3/041 |
| 2017/0285848 A1* | 10/2017 | Rosenberg | G06F 3/0202 |
| 2017/0308196 A1* | 10/2017 | Jeong | G06F 3/044 |
| 2018/0039352 A1* | 2/2018 | Wu | H01L 51/0097 |
| 2018/0150112 A1* | 5/2018 | Aoki | G06F 1/1652 |
| 2018/0375040 A1* | 12/2018 | Li | G09F 9/301 |

\* cited by examiner

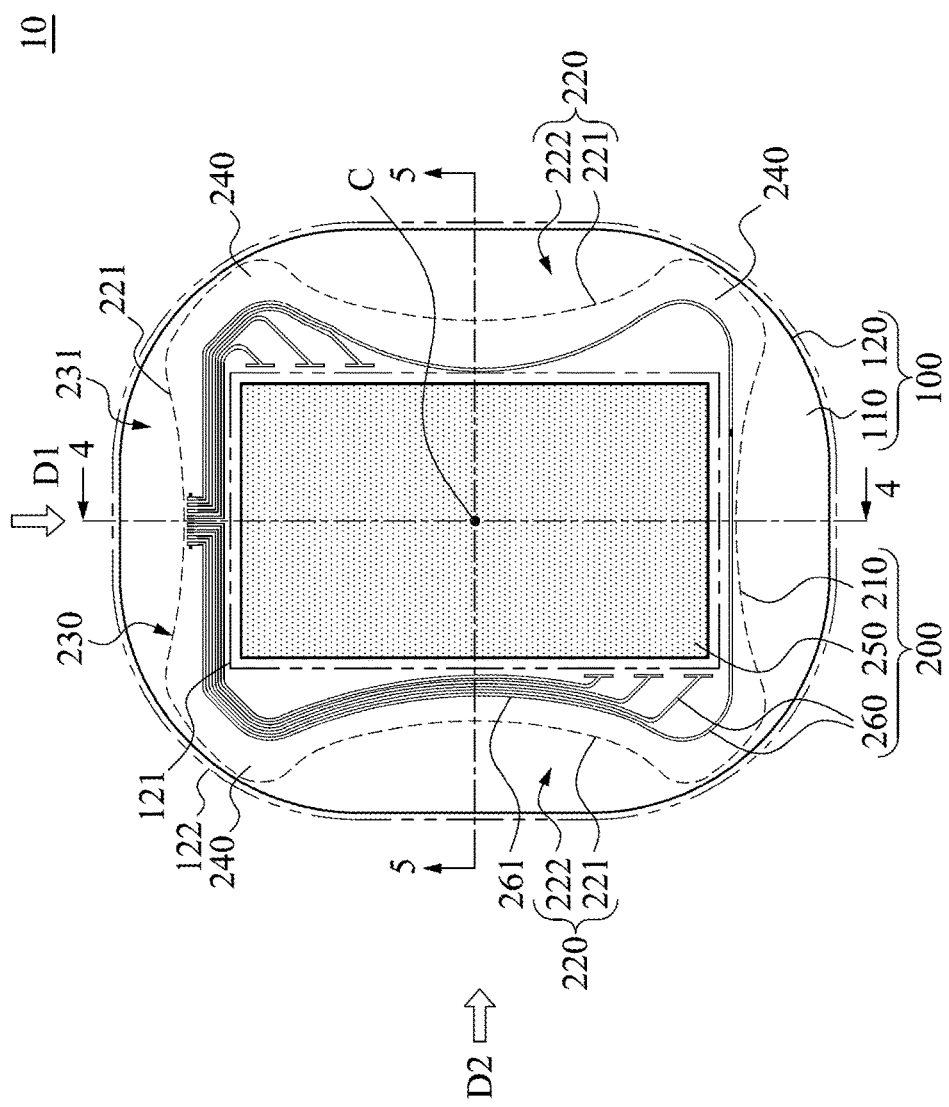

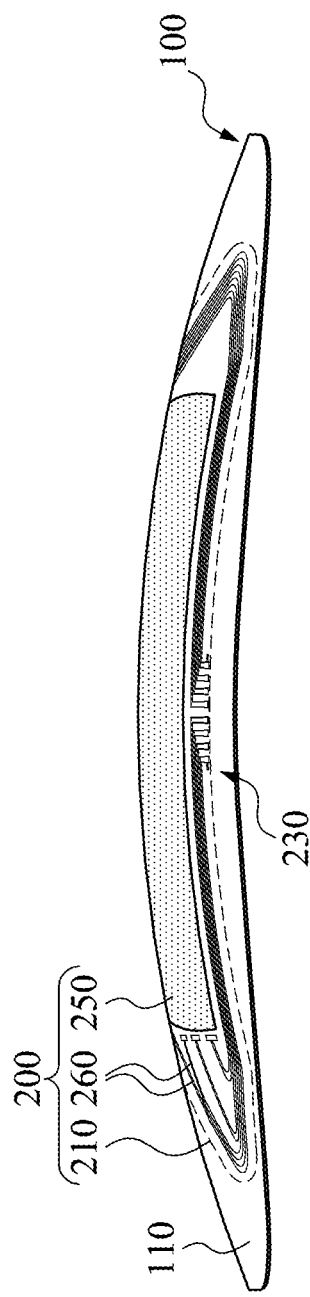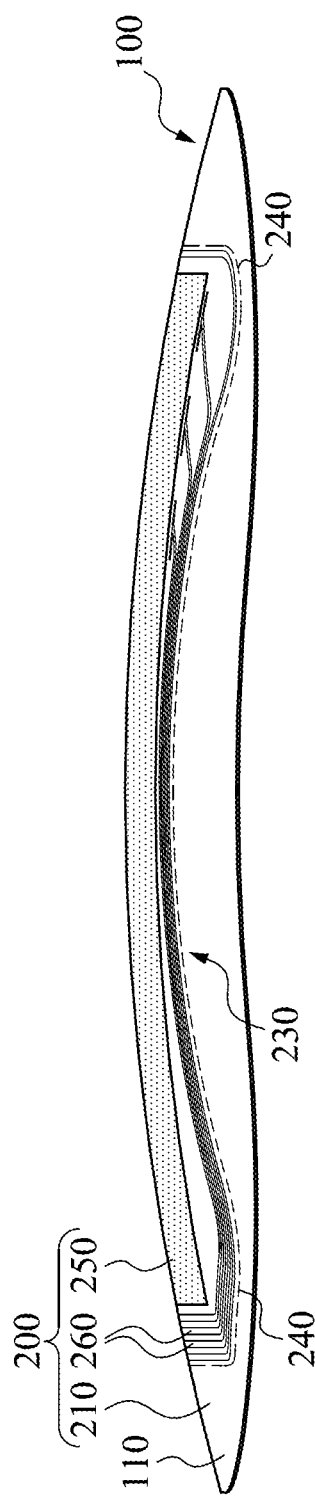

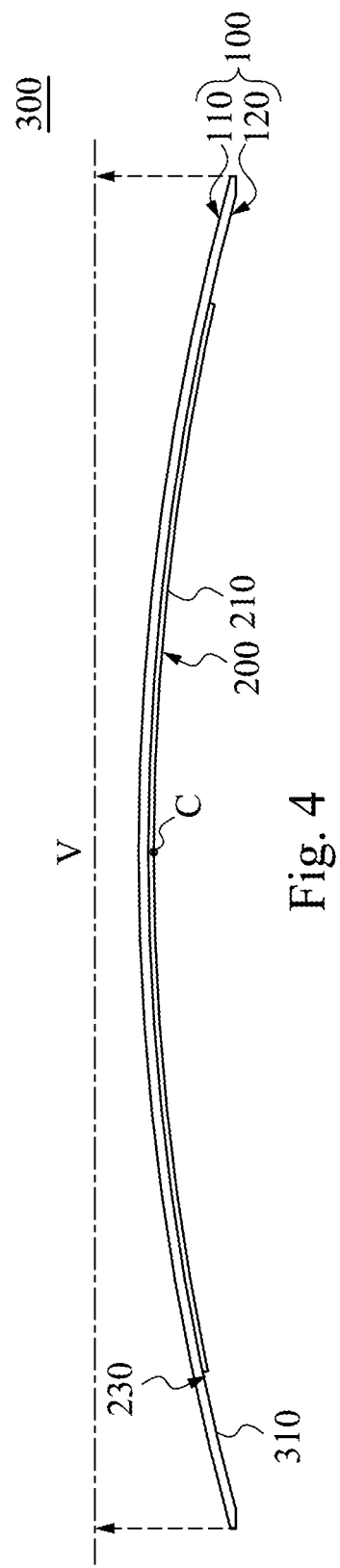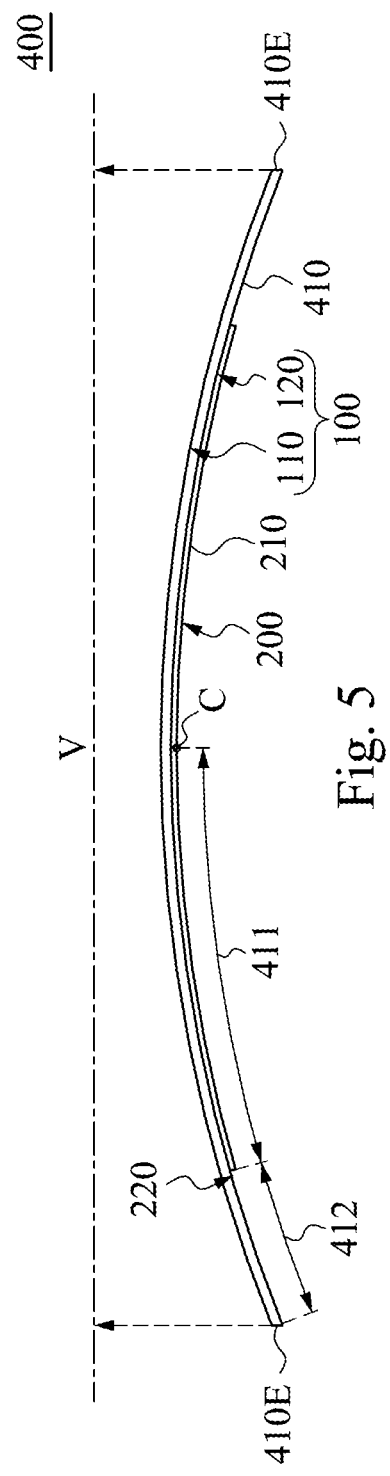

THREE-DIMENSIONAL CURVED TOUCH PANEL AND TOUCH DISPLAY APPARATUS

RELATED APPLICATIONS

This application claims priority to Chinese Application Serial Number 201710970187.1, filed Oct. 16, 2017, which is herein incorporated by reference.

BACKGROUND

Field of Disclosure

The present disclosure relates to a touch panel. More particularly, the present disclosure relates to a three-dimensional curved touch panel, its touch-sensing module and touch display apparatus.

Description of Related Art

In a conventional intelligent electronic device, a transparent protection panel is generally installed on a touch panel or a touch display module of the conventional intelligent electronic device. However, with users' requirements of considering dimensional appearance texture and practical human factors engineering, the trends of the intelligent electronic device using a three-dimensional curved transparent protective panel, for example, are also gradually increased.

However, because a present touch module film is mostly suitable to be bonded on a full-plane transparent protection panel only, if the touch module film is bonded on a three-dimensional curved transparent protective panel instead, creases will be caused on the touch module film near the periphery of the three-dimensional curved transparent protective panel, thus resulting in circuit damage and poor appearance problems.

SUMMARY

According to one embodiment, a three-dimensional curved touch panel includes a light-transmissivity substrate and a touch-sensing module. The light-transmissivity substrate includes a placement surface defined with a sensing area and a surrounding area thereon. The surrounding area surrounds the sensing area. The placement surface is a three-dimensional curved surface. A first parabola is provided in a longitudinal sectional plane of the light-transmissivity substrate, a second parabola is provided in a transverse sectional plane of the light-transmissivity substrate which is shorter than the first parabola, and an intersection point of the first parabola and the second parabola is located at the sensing area, and a slope variation of the first parabola is smaller than a slope variation of the second parabola. The touch-sensing module is bonded to the sensing area and the surrounding area of the placement surface, wherein the touch-sensing module is provided with two first indentation portions which are opposite to each other at an edge of the touch-sensing module, the first indentation portions are located at the surrounding area, the sensing area is located between the first indentation portions, and the second parabola passes through the first indentation portions.

Thus, creases will not be caused on the touch-sensing module approximating to the periphery of the three-dimensional curved surface of the light-transmissivity substrate so as to avoid resulting in circuit damage and poor appearance problems, thereby improving manufacturing yield and reducing production costs.

In one or more embodiments of the present disclosure, the touch-sensing module includes a sensing electrode pattern and a plurality of leads. The sensing electrode pattern is disposed on the sensing area. The leads are disposed on the surrounding area, electrically connected to the sensing electrode pattern. The leads are partially located between one of the first indentation portions and the sensing electrode pattern.

In one or more embodiments of the present disclosure, at least one of the leads includes a curved segment, and the one of the first indentation portions is provided with an arc line, wherein a gap is formed between the arc line and the curved segment.

In one or more embodiments of the present disclosure, the touch-sensing module is further provided with two second indentation portions at the edge of the touch-sensing module. The second indentation portions are disposed on the surrounding area, and the first parabola passes through the second indentation portions. The first indentation portions are respectively formed on two opposite sides of the sensing area, and the second indentation portions are respectively formed on another two opposite sides of the sensing area.

In one or more embodiments of the present disclosure, the touch-sensing module is provided with a plurality of protrusions respectively disposed on the surrounding area, each of the protrusions is located between one of the first indentation portions and one of the second indentation portions, wherein the leads are partially located on the protrusions.

In one or more embodiments of the present disclosure, a part from one end of the second parabola to the intersection point along the second parabola in the transverse sectional surface of the light-transmissivity substrate is at least divided with one first segment and one second segment which is located between the intersection point and the first segment. A curvature of the second segment is not equal to a curvature of the first parabola, and one position of the placement surface corresponding to the second segment is exposed outwardly by each of the first indentation portions.

In one or more embodiments of the present disclosure, the light-transmissivity substrate further includes a symmetrical long axis and a symmetrical short axis which are intersected with each other. A first orthographic projection of the first parabola onto a virtual reference plane overlaps with the symmetrical long axis of the light-transmissivity substrate, and a second orthographic projection of the second parabola onto the virtual reference plane overlaps with the symmetrical short axis of the light-transmissivity substrate.

According to another embodiment, a touch-sensing module includes an optical film, a sensing electrode pattern and a plurality of leads. The optical film has two first indentation portions which are opposite to each other at an edge of the optical film. The sensing electrode pattern is disposed on one surface of the optical film, and is located between the first indentation portions. The leads are formed on the surface of the optical film, and are electrically connected to the sensing electrode pattern. The leads are partially located between one of the first indentation portions and the sensing electrode pattern.

In one or more embodiments of the present disclosure, at least one of the leads includes a curved segment. The one of the first indentation portions is provided with an arc line. A gap is formed between the arc line and the curved segment.

In one or more embodiments of the present disclosure, the optical film includes two second indentation portions at the edge of the optical film. The first indentation portions are respectively formed on two opposite sides of the sensing electrode pattern, and the second indentation portions are respectively formed on another two opposite sides of the sensing electrode pattern.

In one or more embodiments of the present disclosure, the optical film is provided with a plurality of protrusions, and each of the protrusions is located between one of the first indentation portions and one of the second indentation portions, wherein the leads are partially located on the protrusions.

According to another embodiment, a touch display apparatus includes the aforementioned three-dimensional curved touch panel and a display module is covered by the light-transmissivity substrate of the three-dimensional curved touch panel.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

FIG. 2 is a top view of the three-dimensional curved touch panel of FIG. 1 after assembled;

FIG. 3A is a side view of the three-dimensional curved touch panel viewed in a direction D1 of FIG. 2;

FIG. 3B is a side view of the three-dimensional curved touch panel viewed in a direction D2 of FIG. 2;

FIG. 4 is a cross sectional view of FIG. 2 viewed along a line 4-4;

FIG. 5 is a cross sectional view of FIG. 2 viewed along a line 5-5;

DESCRIPTION OF THE EMBODIMENTS

Figure 1:
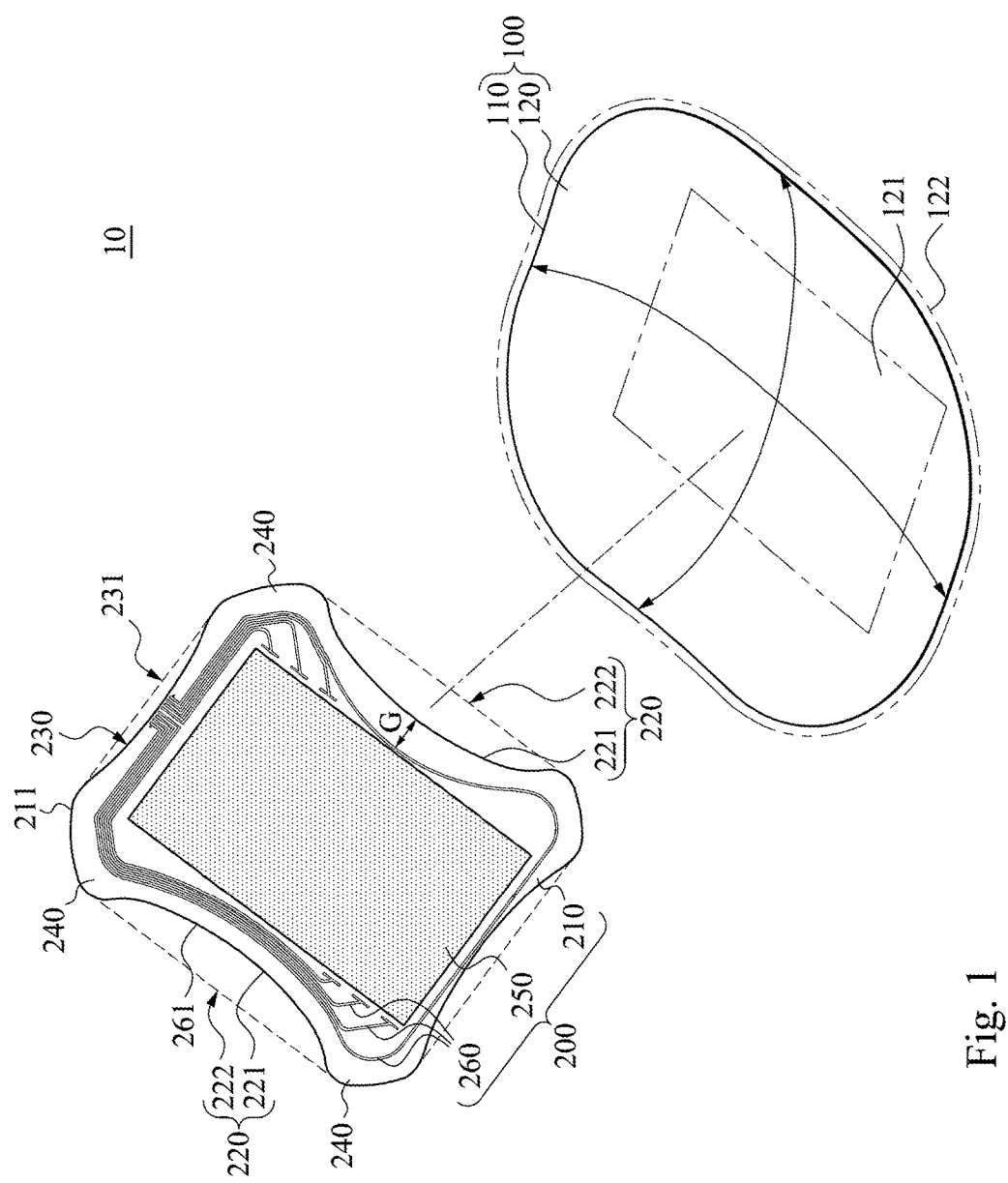
FIG. 1 is an exploded view of a three-dimensional curved touch panel according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference is now made to FIG. 1 to FIG. 3B in which FIG. 1 is an exploded view of a three-dimensional curved touch panel 10 according to one embodiment of the present disclosure; FIG. 2 is a top view of the three-dimensional curved touch panel 10 of FIG. 1 after assembled; FIG. 3A is a side view of the three-dimensional curved touch panel 10 viewed in a direction D1 of FIG. 2; and FIG. 3B is a side view of the three-dimensional curved touch panel viewed in a direction D2 of FIG. 2.

As shown in FIG. 1 and FIG. 2, the three-dimensional curved touch panel 10 includes a light-transmissivity substrate 100 and a touch-sensing module 200. The light-transmissivity substrate 100 is a three-dimensional structure with a three-dimensional curved surface. The light-transmissivity substrate 100 includes a placement surface 120 (FIG. 1) and an external surface 110 (FIG. 3A) which are opposite to each other. Both of the external surface 110 and the placement surface 120 are three-dimensional curved surfaces which are formed by quadratic curves. The external surface 110 is a convexly curved surface, and the placement surface 120 is a concavely curved surface. The light-transmissivity substrate 100 has a symmetrical long axis (e.g., line 4-4) and a symmetrical short axis (e.g., line 5-5) which are perpendicular to each other (or at least are intersected with each other), that is, the length of the light-transmissivity substrate 100 extends along a symmetrical long axis, and the width of the light-transmissivity substrate 100 extends along a symmetrical short axis. A sensing area 121 and a surrounding area 122 are defined on the placement surface 120. The surrounding area 122 surrounds the sensing area 121. The three-dimensional curved surface (i.e., the placement surface 120) may broadly refer to as a hypersurface of any dimension defined as a trace of solutions of a multivariate quadratic equation. The hypersurface, for example, may be an ellipsoid surface, a spheroid surface, a spherical surface, an elliptical paraboloid, a hyperbolic paraboloid, but the present disclosure is not limited thereto. For example, but not limited to, the light-transmissivity substrate 100 is a flexible substrate. In another embodiment, the light-transmissivity substrate 100 may be a rigid substrate.

The touch-sensing module 200 is used to sense and receive user's actions, gestures and the like performed on the external surface 110. The touch-sensing module 200 is, for example, a sensor film. The touch-sensing module 200 includes an optical film 210, a sensing electrode pattern 250 and a plurality of leads 260. The optical film 210 of the touch-sensing module 200 is bonded to the sensing area 121 and the surrounding area 122 of the placement surface 120. The edge 211 of the optical film 210 has two first indentation portions 220. The first indentation portions 220 are arranged opposite and symmetrical to each other. The sensing electrode pattern 250 is disposed on one surface of the optical film 210, for example but not limited to, the sensing electrode pattern 250 is formed on one surface of the touch-sensing module 200 facing towards the light-transmissivity substrate 100. The sensing electrode pattern 250 is located between the first indentation portions 220, and the aforementioned symmetrical short axis passes through the sensing electrode pattern 250 and the first indentation portions 220. The leads 260 are formed on one surface of the optical film 210. For example, the leads 260 are formed on the same surface of the optical film 210 to the sensing electrode pattern 250. A portion of the leads 260 is located between one of the first indentation portions 220 and the sensing electrode pattern 250, and another portion of the leads 260 is located between the other first indentation portion 220 and the sensing electrode pattern 250. The leads 260 are electrically connected to the sensing electrode pattern 250 such that the sensing electrode pattern 250 may transmit signals to a flexible circuit board (not shown in figures) through the leads 260. It is noted that, the optical film 210 has a generally broad stripe shape, the first indentation portions 220 are respectively located on two opposite longer sides of the optical film 210, and each of the first indentation portions 220 horizontally retracts towards the sensing electrode pattern 250 to define a recessed space 222 which partially exposes the placement surface 120.

Specifically, a portion of the leads 260 respectively includes a curved segment 261 thereon. Each of the first indentation portions 220 to the edge 211 of the optical film 210 is provided with an arc line 221. A gap G is formed between the arc line 221 of the first indentation portions 220 and the curved segment 261 of the leads 260, that is, the portion of the leads 260 will not be located farther than the first indentation portions 220. Therefore, circuit damage and poor appearance problems will not occur.

However, the present disclosure is not limited to that the arc line 221 and the curved segment 261 have to have the same arc. In other embodiments, the shape of the first indentation portions 220 corresponding to the edge of the optical film may be a straight line.

In addition, in order to have efficient space utilization, in the embodiment, the radian of the arc line 221 of the first indentation portions 220 may be approximate or equal to the radian of the curved segment 261. However, the present disclosure is not limited to that the radian of the arc line 221 has to be equal to the radian of the curved segment 261. The present disclosure is not limited to the types and variations of the touch-sensing module 200. In other embodiments, the touch-sensing module includes a nanometallic grid (not shown). In still other embodiments, the material of the touch-sensing module includes indium tin oxide, silver, or other suitable metallic material.

Reference is now made to FIG. 4 to FIG. 5, in which FIG. 4 is a cross sectional view of FIG. 2 viewed along a line 4-4, and FIG. 5 is a cross sectional view of FIG. 2 viewed along a line 5-5. As shown in FIG. 2, FIG. 4 and FIG. 5, the placement surface 120 of the light-transmissivity substrate 100 in a first sectional plane 300 (i.e., a longitudinal sectional plane, FIG. 4) viewed along a first axis (i.e., line 4-4) is provided with a first parabola 310. The placement surface 120 of the light-transmissivity substrate 100 in a second sectional plane 400 (i.e., a transverse sectional plane, FIG. 5) viewed along a second axis (i.e., line 5-5) is provided with a second parabola 410. An intersection point C of the first parabola 310 and the second parabola 410 is located at the sensing area 121. The length of the second parabola 410 is shorter than the length of the first parabola 310, and a slope variation of the first parabola 310 is smaller than a slope variation of the second parabola 410. That is, compared to the first parabola 310 and the second parabola 410, the radian of the second parabola 410 has to be steeper than the radian of the first parabola 310. The second parabola 410 passes through both of the first indentation portions 220, that is, both of the first indentation portions 220 are respectively located at two areas of the placement surface 120 corresponding to the second parabola 410. Thus, because the areas of the placement surface 120 corresponding to the second parabola 410 for being bonded by the touch-sensing module 200 are reduced, creases caused by the touch-sensing module 200 to the placement surface 120 can be decreased accordingly.

More particularly, as shown in FIG. 5, a portion of the second parabola 410 from the aforementioned intersection point C to one of two opposite ends 410E of the second parabola 410 is at least divided into a first segment 411 and a second segment 412 which is located between the intersection point C and the first segment 411, and the second segment 412 is connected to the first segment 411 and the end 410E. An area of the placement surface 120 corresponding to the second segment 412 is exposed by each of the first indentation portions 220. That is, each of the recessed spaces 222 of the first indentation portions 220 exposes the second segment 412 of the placement surface 120. A curvature of the first segment 411 is equal to or at least approximate to a curvature of the first parabola 310, and a curvature of the second segment 412 is not equal to the curvature of the first parabola 310. Thus, since each of the recessed spaces 222 of the first indentation portions 220 exposes the second segment 412 of the placement surface 120, it means that the optical film 210 is not bonded on the position of the second segment 412 of the placement surface 120. Accordingly, creases will not be caused on the area of the optical film 210 corresponding to the second segment 412 of the placement surface 120.

Needed to be defined is that, in the embodiment, when one virtual reference plane V (i.e., level surface) is hypothetically located above the external surface 110 of the light-transmissivity substrate 100, a first orthographic projection of the first parabola 310 onto the virtual reference plane V overlaps with the symmetrical long axis (i.e., line 4-4, FIG. 2) of the light-transmissivity substrate 100 (FIG. 4), and a second orthographic projection of the second parabola 410 onto the virtual reference plane V overlaps with the symmetrical short axis (i.e., line 5-5, FIG. 2) of the light-transmissivity substrate. However, the outline of the light-transmissivity substrate 100 in the present disclosure is not mandatorily limited thereto.

Furthermore, referring again to FIG. 2, the touch-sensing module 200 is further provided with two second indentation portions 230 at the edge of the optical film 210. The second indentation portions 230 are arranged opposite to each other, and are symmetrical to each other in the surrounding area 122. The second indentation portions 230 are respectively located on two opposite shorter sides of the optical film 210, and each of the second indentation portions 230 vertically retract towards the sensing electrode pattern 250 to define a respective recessed space 231 which partially exposes the placement surface 120. In other words, if an orthographic projection of the sensing area 121 onto the virtual reference plane V is of a rectangular shape, the first indentation portions 220 are respectively formed on two opposite sides of the sensing area 121 (i.e., the sensing electrode pattern 250), and the second indentation portions 230 are respectively formed on another two opposite sides of the sensing area 121 (i.e., the sensing electrode pattern 250). The first parabola 310 passes through both of the second indentation portions 230, that is, both of the second indentation portions 230 are respectively located at the placement surface 120 corresponding to the first parabola 310.

Since the first indentation portions 220 and the second indentation portions 230 of the touch-sensing module 200 respectively retract towards the sensing electrode pattern 250 on the optical film 210, four protrusions 240 are respectively formed on the optical film 210. Each of the protrusions 240 is located between one of the first indentation portions 220 and one of the second indentation portions 230. The protrusions 240 are respectively disposed on the surrounding area 122, and the leads 260 are partially located on the protrusions 240. Thus, through the protrusions 240, the first indentation portions 220 and the second indentation portions 230 are staggered on the optical film 210. When the optical film 210 is bonded on the light-transmissivity substrate 100, the issue of stress concentration around the optical film to which the touch-sensing module 200 is bonded can be improved so as to decrease the creases on the touch-sensing module 200 bonded to the placement surface 120.

In one embodiment, the optical film 210 of a rectangular shape is originally suitable for being bonded on a full-plane transparent protection panel. However, a rectangular optical film can be trimmed to form the aforementioned optical film 210 of the touch-sensing module 200 (FIG. 1) before the sensing electrode pattern 250 and the leads 260 are formed on the optical film 210, without needing to additionally design an optical film i that is suitable for being bonded to a three dimensional curved surface. The shape of the optical film 210 of the touch-sensing module 200 is not limited thereto. For example, the shape of the touch-sensing module 200 may be a circle, an ellipse, a rectangle, a polygon, or an arc angle rectangle.

Although both of the sensing electrode pattern 250 and the leads 260 are disposed between the optical film 210 and the light-transmissivity substrate 100 in the embodiment, yet in another embodiment, both of the sensing electrode pattern 250 and the leads 260 also can be altered to be on one surface of the optical film 210 opposite to the light-transmissivity substrate 100 instead.

Figure 6:
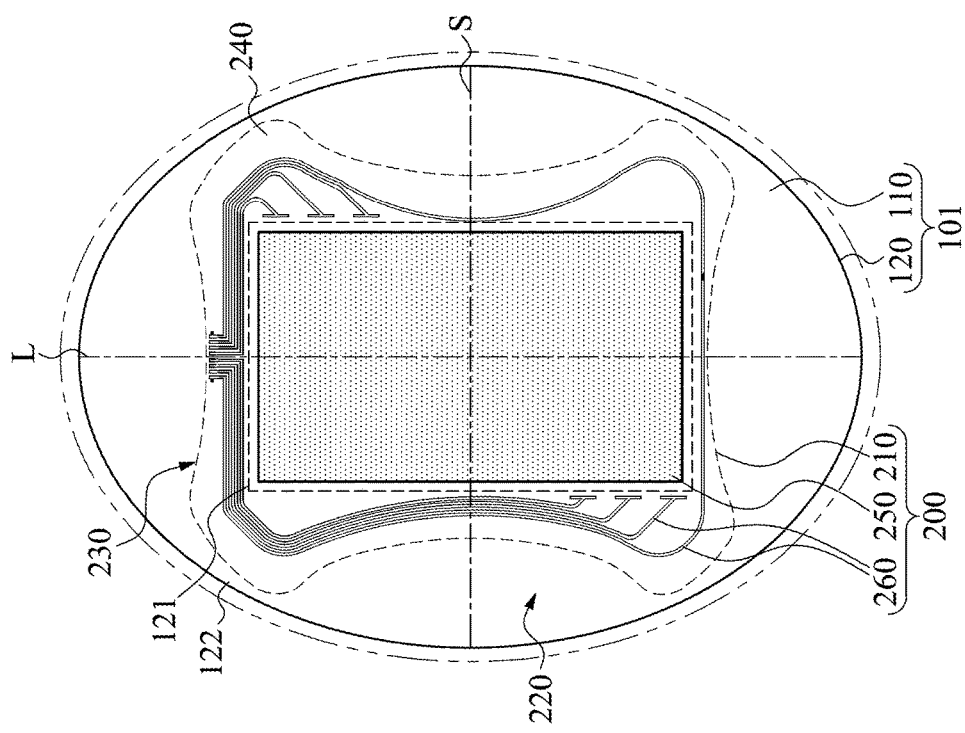
FIG. 6 is a top view of a three-dimensional curved touch panel according to one embodiment of the present disclosure.

FIG. 6 is a top view of a three-dimensional curved touch panel 11 according to one embodiment of the present disclosure. As shown in FIG. 1 and FIG. 6, the three-dimensional curved touch panel 11 of FIG. 6 and the three-dimensional curved touch panel 10 of FIG. 1 are substantially the same, in which the same elements are labeled with the same numerical references in FIG. 6. However, at least one difference of the three-dimensional curved touch panel 11 of FIG. 6 from the three-dimensional curved touch panel 10 of FIG. 1 is that, an orthographic projection of the placement surface 120 of the light-transmissivity substrate 101 in FIG. 6 is an ellipse, and the first orthographic projection of the first parabola 310 (referring to FIG. 4) is the major axis L of the ellipse, while the second orthographic projection of the second parabola 410 (referring to FIG. 5) is the ellipse minor axis S. However, the placement surface 120 of the light-transmissivity substrate 101 is not limited thereto.

Figure 7:
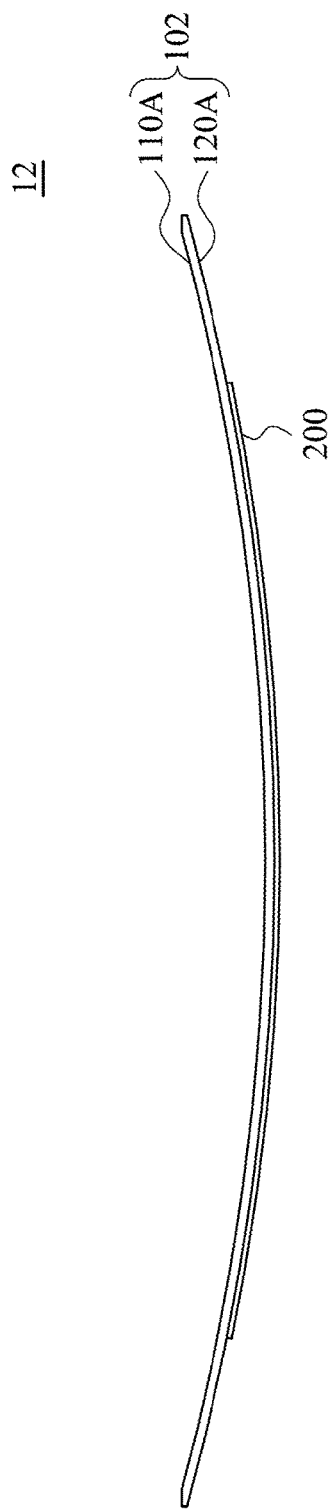
FIG. 7 is a cross sectional view of a three-dimensional curved touch panel according to one embodiment of the present disclosure, wherein the crossed location is the same as FIG. 5.

FIG. 7 is a cross-sectional view of a three-dimensional curved touch panel 12 according to one embodiment of the present disclosure wherein the crossed location is the same as FIG. 5. As shown in FIG. 1 and FIG. 7, the three-dimensional curved touch panel 12 of FIG. 7 and the three-dimensional curved touch panel 10 of FIG. 1 are substantially the same, in which the same elements are labeled with the same numerical references in FIG. 7. However, at least one difference of the three-dimensional curved touch panel 12 of FIG. 7 from the three-dimensional curved touch panel 10 of FIG. 1 is that, the placement surface 120A of the three-dimensional curved touch panel 12 in FIG. 7 is a convexly curved surface, and the external surface 110 is a concavely curved surface, and the touch-sensing module 200 is bonded to the placement surface 120A.

Figure 8:
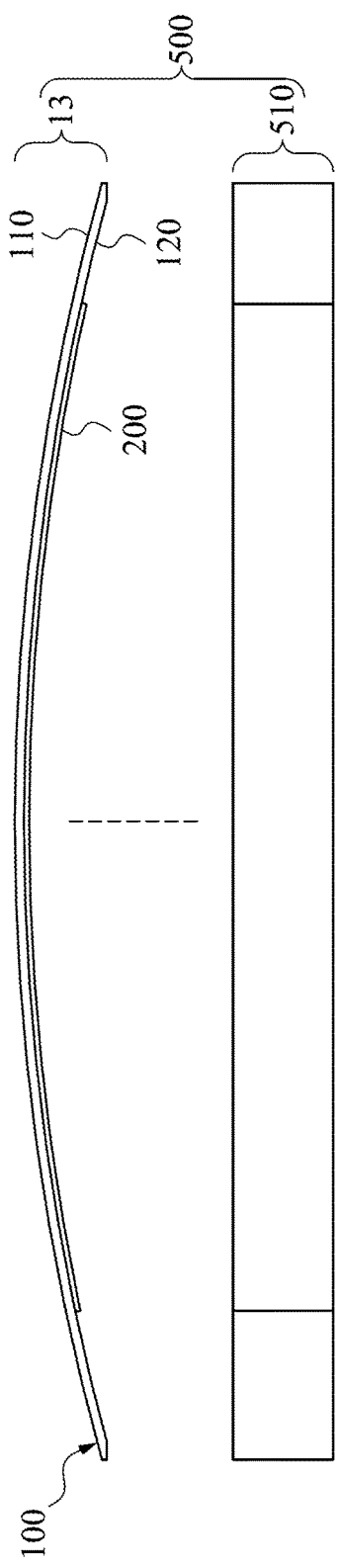
FIG. 8 is a schematic view of a touch display apparatus according to one embodiment of the present disclosure.

FIG. 8 is a schematic view of a touch display apparatus 500 according to one embodiment of the present disclosure. As shown FIG. 8, the touch display apparatus 500 includes the three-dimensional curved touch panel 13 described above in any of the embodiments, and a display module 510. The three-dimensional curved touch panel 13 is bonded to the display module 510 through an adhesive (not shown), and the display module 510 is covered and protected by the light-transmissivity substrate 100 the light-transmissivity substrate 100. The present disclosure is not limited to the touch display apparatus 500 with the three-dimensional curved touch panel 13. In other embodiments, the present disclosure may also have a touch device using the three-dimensional curved touch panel.

In view of the foregoing, the present disclosure provides a three-dimensional curved touch panel including a light-transmissivity substrate and a touch-sensing module. The light-transmissivity substrate includes a placement surface on which a sensing area and a surrounding area are defined. The surrounding area surrounds the sensing area. The placement surface is a three-dimensional curved surface. A first parabola is provided in a longitudinal sectional plane of the light-transmissivity substrate; a second parabola is provided in a transverse sectional plane of the light-transmissivity substrate and is shorter than the first parabola; an intersection point of the first parabola and the second parabola is located at the sensing area; and a slope variation of the first parabola is smaller than a slope variation of the second parabola. The touch-sensing module is bonded to the sensing area and the surrounding area of the placement surface, wherein the touch-sensing module is provided with two first indentation portions which are opposite to each other at an edge of the touch-sensing module, the first indentation portions are located at the surrounding area, the sensing area is located between the first indentation portions, and the second parabola passes through the first indentation portions. Thus, creases will not be caused on the touch-sensing module near the periphery of the three-dimensional curved surface of the light-transmissivity substrate, so as to avoid circuit damage and poor appearance problems, thereby improving manufacturing yield and reducing production costs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A three-dimensional curved touch panel, comprising:
a light-transmissivity substrate comprising a placement surface on which a sensing area and a surrounding area surrounding the sensing area are defined, wherein the placement surface is a three-dimensional curved surface, a first parabola is provided in a longitudinal sectional plane of the light-transmissivity substrate, a second parabola is provided in a transverse sectional plane of the light-transmissivity substrate and is shorter than the first parabola, and an intersection point of the first parabola and the second parabola is located in the sensing area, and a slope variation of the first parabola is smaller than a slope variation of the second parabola; and a touch-sensing module bonded to the sensing area and the surrounding area of the placement surface, wherein the touch-sensing module is provided with two first indentation portions which are opposite to each other at an edge of the touch-sensing module, the first indentation portions are located in the surrounding area, the sensing area is located between the first indentation portions, and the second parabola passes through the first indentation portions.

2. The three-dimensional curved touch panel of claim 1, wherein the touch-sensing module comprises:
   a sensing electrode pattern disposed in the sensing area; and
   a plurality of leads that are disposed in the surrounding area and are electrically connected to the sensing electrode pattern, wherein the leads are at least partially located between one of the first indentation portions and the sensing electrode pattern.

3. The three-dimensional curved touch panel of claim 2, wherein at least one of the leads comprises a curved segment, and the one of the first indentation portions is provided with an arc line, wherein the arc line is spaced from the curved segment at a gap.

4. The three-dimensional curved touch panel of claim 2, wherein the touch-sensing module is further provided with two second indentation portions at the edge of the touch-sensing module, the second indentation portions are disposed in the surrounding area, and the first parabola passes through the second indentation portions,
   wherein the first indentation portions are respectively disposed on two opposite sides of the sensing area, and the second indentation portions are respectively disposed on another two opposite sides of the sensing area.

5. The three-dimensional curved touch panel of claim 4, wherein the touch-sensing module is provided with a plurality of protrusions respectively disposed on the surrounding area, each of the protrusions is located between any two adjacent first and second indentation portions, wherein the leads are partially located on the protrusions.

6. The three-dimensional curved touch panel of claim 1, wherein a portion of the second parabola from one end of the second parabola to the intersection point in the transverse sectional plane of the light-transmissivity substrate is at least divided into a first segment and a second segment which is located between the intersection point and the first segment,
   wherein a curvature of the second segment is not equal to a curvature of the first parabola, and each of the first indentation portions exposes a position of the placement surface corresponding to the second segment.

7. The three-dimensional curved touch panel of claim 1, wherein the light-transmissivity substrate further comprises a symmetrical long axis and a symmetrical short axis which are intersected with each other,
   wherein a first orthographic projection of the first parabola onto a virtual reference plane overlaps with the symmetrical long axis of the light-transmissivity substrate, and a second orthographic projection of the second parabola onto the virtual reference plane overlaps with the symmetrical short axis of the light-transmissivity substrate.

8. A touch display apparatus, comprising:
   a three-dimensional curved touch panel, comprising:
      a light-transmissivity substrate comprising a placement surface on which a sensing area and a surrounding area are defined, the surrounding area surrounding the sensing area, wherein the placement surface is a three-dimensional curved surface, a first parabola is provided in a longitudinal sectional plane of the light-transmissivity substrate, a second parabola is provided in a transverse sectional plane of the light-transmissivity substrate which is shorter than the first parabola, and an intersection point of the first parabola and the second parabola is located at the sensing area, and a slope variation of the first parabola is smaller than a slope variation of the second parabola; and
      a touch-sensing module bonded to the sensing area and the surrounding area of the placement surface, wherein the touch-sensing module is provided with two first indentation portions which are opposite to each other at an edge of the touch-sensing module, the first indentation portions are located at the surrounding area, the sensing area is located between the first indentation portions, and the second parabola passes through the first indentation portions; and
   a display module covered by the light-transmissivity substrate.

9. The touch display apparatus of claim 8, wherein the touch-sensing module comprises:
   a sensing electrode pattern disposed on the sensing area; and
   a plurality of leads that are disposed on the surrounding area, and are electrically connected to the sensing electrode pattern, wherein the leads are partially located between one of the first indentation portions and the sensing electrode pattern.

10. The touch display apparatus of claim 9, wherein at least one of the leads comprises a curved segment, and the one of the first indentation portions is provided with an arc line, wherein a gap is formed between the arc line and the curved segment.

11. The touch display apparatus of claim 9, wherein the touch-sensing module is further provided with two second indentation portions at the edge of the touch-sensing module, the second indentation portions are disposed on the surrounding area, and the first parabola passes through the second indentation portions,
   wherein the first indentation portions are respectively formed on two opposite sides of the sensing area, and the second indentation portions are respectively formed on another two opposite sides of the sensing area.

12. The touch display apparatus of claim 11, wherein the touch-sensing module is provided with a plurality of protrusions respectively disposed on the surrounding area, and each of the protrusions is located between one of the first indentation portions and one of the second indentation portions, wherein the leads are partially located on the protrusions.

13. The touch display apparatus of claim 8, wherein a portion of the second parabola from one end of the second parabola to the intersection point in the transverse sectional plane of the light-transmissivity substrate is at least divided into a first segment and a second segment which is located between the intersection point and the first segment,
   wherein a curvature of the second segment is not equal to a curvature of the first parabola, and each of the first indentation portions exposes one position of the placement surface corresponding to the second segment.

14. The touch display apparatus of claim 8, wherein the light-transmissivity substrate further comprises a symmetrical long axis and a symmetrical short axis which are intersected with each other,
 wherein a first orthographic projection of the first parabola onto a virtual reference plane overlaps with the symmetrical long axis of the light-transmissivity substrate, and a second orthographic projection of the second parabola onto the virtual reference plane overlaps with the symmetrical short axis of the light-transmissivity substrate.

* * * * *